(12) United States Patent
Ahluwalia et al.

(10) Patent No.: US 9,504,013 B2
(45) Date of Patent: Nov. 22, 2016

(54) COMMUNICATION SYSTEM

(71) Applicant: NEC Corporation, Minato-ku, Tokyo (JP)

(72) Inventors: Jagdeep Singh Ahluwalia, Tokyo (JP); Kenji Kawaguchi, Tokyo (JP); Neeraj Gupta, Tokyo (JP); Hideki Kozuka, Tokyo (JP)

(73) Assignee: NEC CORPORATION, Tokoyo (JP)

( * ) Notice: Subject to any disclaimer, the term of this patent is extended or adjusted under 35 U.S.C. 154(b) by 8 days.

(21) Appl. No.: 14/417,973

(22) PCT Filed: Jul. 2, 2013

(86) PCT No.: PCT/JP2013/068574
§ 371 (c)(1),
(2) Date: Jan. 28, 2015

(87) PCT Pub. No.: WO2014/021059
PCT Pub. Date: Feb. 6, 2014

(65) Prior Publication Data
US 2015/0289229 A1    Oct. 8, 2015

(30) Foreign Application Priority Data

Aug. 1, 2012    (GB) .................................. 1213711.3

(51) Int. Cl.
*H04W 68/00*    (2009.01)
*H04W 68/04*    (2009.01)
(Continued)

(52) U.S. Cl.
CPC ............. *H04W 68/04* (2013.01); *H04W 68/02* (2013.01); *H04W 84/027* (2013.01)

(58) Field of Classification Search
CPC ... H04W 68/08; H04W 64/00; H04W 68/02; H04W 68/04; H04W 68/06
USPC ............................................... 455/458, 456.1
See application file for complete search history.

(56) References Cited

U.S. PATENT DOCUMENTS

| | | | |
|---|---|---|---|
| 5,875,400 A | 2/1999 | Madhavapeddy et al. | |
| 2004/0043774 A1* | 3/2004 | Lee | H04W 64/00 455/456.1 |

(Continued)

FOREIGN PATENT DOCUMENTS

| | | |
|---|---|---|
| EP | 1071304 A1 | 1/2001 |
| EP | 1643792 A1 | 4/2006 |

(Continued)

OTHER PUBLICATIONS

Japanese Office Action for JP Application No. 2015-506017 mailed on Nov. 11, 2015 with English Translation.

(Continued)

*Primary Examiner* — Charles Shedrick

(57) ABSTRACT

The present invention provides a communication node for a communication network. The communication node includes means for identifying that paging is required for a mobile communication device, means for obtaining information identifying at least one cell in which said mobile communication device has been located previously and for obtaining further information relating to at least one of movement of the mobile communication device between cells and a time when said mobile communication device was located in said at least one cell, means for defining a set comprising at least one cell in which to seek said mobile communication device, based on said information and said further information, and means for initiating transmission of a respective paging message for said mobile communication device in each cell of said set.

36 Claims, 10 Drawing Sheets

(51) Int. Cl.
*H04W 68/02* (2009.01)
*H04W 84/02* (2009.01)

(56) References Cited

U.S. PATENT DOCUMENTS

| | | |
|---|---|---|
| 2008/0254814 A1 | 10/2008 | Harris et al. |
| 2010/0113070 A1 | 5/2010 | Nigam et al. |
| 2010/0173652 A1 | 7/2010 | Nigam et al. |
| 2011/0143802 A1 | 6/2011 | Shin et al. |

FOREIGN PATENT DOCUMENTS

| | | |
|---|---|---|
| EP | 1662824 A1 | 5/2006 |
| EP | 2254378 A1 | 11/2010 |
| EP | 2320694 A1 | 5/2011 |
| JP | 2001-069562 A | 3/2001 |
| JP | 2004-088783 A | 3/2004 |
| WO | 98/36603 A2 | 8/1998 |
| WO | 01/78421 A2 | 10/2001 |
| WO | 03/056868 A1 | 7/2003 |
| WO | 2008/127906 A1 | 10/2008 |
| WO | 2009/048555 A1 | 4/2009 |
| WO | 2010/071545 A1 | 6/2010 |

OTHER PUBLICATIONS

International Search Report for PCT Application No. PCT/JP2013/068574, mailed on Oct. 18, 2013.

* cited by examiner

COMMUNICATION SYSTEM

This application is a National Stage Entry of PCT/JP2013/068574 filed on Jul. 2, 2013, which claims priority from United Kingdom Patent Application 1213711.3 filed on Aug. 1, 2012, the contents of all of which are incorporated herein by reference, in their entirety.

TECHNICAL FIELD

The present invention relates to mobile communication devices and networks, particularly but not exclusively those operating according to the 3rd Generation Partnership Project (3GPP) standards or equivalents or derivatives thereof. The invention has particular although not exclusive relevance to reduction of the paging signalling load in these networks.

BACKGROUND ART

Under the 3GPP standards, a NodeB (or an eNB in LTE (i.e. Long Term Evolution)) is the base station via which mobile devices connect to the core network and which defines a cell of the network. Home base stations (HNB) provide short range 3G radiofrequency (RF) coverage, and are sometimes referred to as a femto access point (FAP). Where the home base station is operating in accordance with the LTE standards, the HNB is commonly referred to as an HeNB. The HNB or HeNB provides radio coverage (for example, 3G, 4G and/or WiMAX) within the home, small or medium enterprises, shopping malls, etc. and typically connects to the core network via a suitable Home eNB gateway HeNB GW and public or corporate broadband (BB) access network (for example via an ADSL link to the Internet). During operation in a normal operation mode or normal state, the HNB or HeNB enables users of a User Equipment (UE) to communicate with other such users via one of a number of the base stations (eNodeB, eNB), the HeNB GW and a core network.

In a connected or active state or mode, a UE is registered with the network and has an RRC (Radio Resource Control) connection with a base station, so that the network can identify which cell the UE belongs to and can transmit data to and receive data from the UE. In LTE, in the active state or mode, the Handover procedure allows UEs to have service continuity while moving within the Intra LTE system (Intra RAT and Inter Frequency) and towards other RATS (Radio Access Technologies).

A UE also has a power conservation or idle state or mode in which, typically, the UE is not transmitting or receiving data, and no context about the UE is stored by the base station. In the idle state, the location of the UE is known only (to the MME (Mobility Management Entity) in 3GPP) at the granularity of a Tracking Area (TA) comprising a cluster or group of base station cells. When in the idle state, a UE selects and reselects cells according to the parameters broadcast by the base station in the BCH (Broadcast Channel), with a frequency given by a Cell Reselection Timer Value, and the base station is not aware of the cell selections/reselections made by the UE. If a UE moves into a cell which is not part of the tracking area(s) it is registered with at the MME, then a tracking area update is triggered in order to inform the MME of the TA in which the UE is currently located.

Currently, in order to establish communications with a UE, a paging request is sent to all the cells of the TA(s) with which the UE is registered at the MME. This results in each HNB or HeNB operating each relevant cell sending a paging message for the UE. Generally, only the base station operating the cell in which the UE is located will receive a paging response from the UE. However, this method of paging a UE uses a significant load on the air interface because a tracking area may comprise a large number of cells, and a UE may be registered with multiple tracking areas. In such cases, the paging overhead is undesirably large.

The invention aims to alleviate the above issues.

SUMMARY OF THE INVENTION

According to one aspect, the invention provides a communication node for a communication network, the communication node comprising: means for identifying that paging is required for a mobile communication device; means for obtaining information identifying at least one cell in which said mobile communication device has been located previously and for obtaining further information relating to at least one of movement of the mobile communication device between cells and a time when said mobile communication device was located in said at least one cell; means for defining a set comprising at least one cell in which to seek said mobile communication device, based on said information and said further information; and means for initiating transmission of a respective paging message for said mobile communication device in each cell of said set.

The communication node may further comprise means for determining whether or not a response has been received from the mobile communication device in response to a paging message for said mobile communication device.

The set may comprise a first set, and the defining means may be operable to define at least one further set comprising at least one cell in which to seek said communication device, based on said information and said further information.

The means for initiating transmission may be operable to initiate transmission of a respective paging message for said mobile communication device in each cell of said at least one further set if said determining means determines that a response has not been received from the mobile communication device in response to a paging message for said mobile communication device transmitted in a cell of said set.

The means for initiating transmission may be operable to initiate: transmission of a respective paging message for said mobile communication device in each cell of the first set after a first time period; and transmission of a respective paging message for said mobile communication device in each cell of the at least one further set after at least one other time period which is longer than said first time period.

The means for initiating transmission may be operable to cancel, prior to expiry of said at least one other time period, transmission of the respective paging message for said mobile communication device in each cell of the at least one further set if said determining means determines that a response has been received from the mobile communication device in response to a paging message for said mobile communication device transmitted in a cell of said first set.

The communication device may further comprise means for signalling said mobile communication device in pursuance of a communications connection with said mobile communication device if said determining means determines that a response has been received from the mobile communication device in response to a paging message for said mobile communication device.

The communication node may further comprise means for updating at least one of said information and said further information in dependence on whether or not a response has been received from the mobile communication device in response to a paging message for said mobile communication device.

The means for identifying that paging is required for the mobile communication device may be operable to identify that dummy paging is required for the mobile communication device and the or at least one said paging message may comprise a dummy paging message.

The means for identifying that paging is required for the mobile communication device may be operable to identify that a communications connection is required for the mobile communication device and the or at least one said paging message may comprise a paging message in pursuance of the communications connection with said mobile communication device.

The further information may identify a respective time at which said mobile communication device was located in said at least one cell.

The further information may comprise information identifying a time elapsed since a connection between said mobile communication device and said communication node was released.

The further information may comprise information identifying at least one further cell in which said mobile communication device has been located previously.

The further information may comprise information identifying a paging time at which said paging message or paging request is to be sent/received, and said communication node may be operable to estimate an expected level of movement of said mobile communication device between said cells based on said paging time.

The communication node may comprise a home base station gateway.

The communication node may comprise a mobility management entity.

The further information may comprise information relating to movement of the mobile communication device between cells when the mobile communication device is in an idle mode.

The further information may comprise information relating to movement of the mobile communication device between cells when the mobile communication device is in a connected mode.

The further information may comprise information relating to at least one transition of the mobile communication device between operating modes (e.g. between an idle mode and a connected mode).

The information identifying at least one cell and/or said further information may comprise a cell ID.

According to another aspect, the invention provides a communication node for a communication network, the communication node comprising: means for identifying that paging is required for a mobile communication device; means for obtaining information identifying at least one cell in which said mobile communication device has been located previously; means for defining a number of sets, each set comprising at least one cell in which to seek said mobile communication device, based on said obtained information; and means for initiating transmission of a respective paging message for said mobile communication device in each cell of the number of sets and for specifying a respective time period after which said transmission should occur; wherein said respective time period is specified in dependence on which set comprises the cell in which each paging message is to be transmitted.

According to another aspect, the invention provides a base station for transmitting paging messages in a cell of a communication network, the cell operated by the base station, the base station comprising: means for providing, to a communication node, information relating to a mobile communication device if the mobile communication device is or has previously been located within the cell, wherein said information comprises information identifying said cell and further information relating to at least one of: movement of the mobile communication device into and/or out of the cell; and a time when said mobile communication device was located in the cell; means for receiving a request from the communication node to transmit a paging message for the mobile communication device, wherein said paging request is transmitted by the communication node based on the information and further information provided by the base station; and means for transmitting an associated paging message for said mobile communication device in the cell in response to the request received from the communication node.

The receiving means may be operable to receive a response to the paging message from the mobile communication device; and said providing means may be operable to provide an indication to said communication node that the response has been received from the mobile communication device.

The base station may be further operable to: signal said mobile communication device in pursuance of a communications connection with said mobile communication device if said receiving means receives a response to the paging message from the mobile communication device.

The response received from the mobile communication device may be a connection request.

If a response to the paging message has not been received from the mobile communication device by the base station, said base station may be further operable to: provide an indication to said communication node that a response to said paging message has not been received from the mobile communication device.

The means for receiving the request to transmit a paging message for the mobile communication device may be operable to receive information identifying a time period after which said paging message should be transmitted to the mobile communication device; and the transmitting means may be operable to transmit the associated paging message after said time period.

The base station may be further operable to: receive an indication from the communication node to cancel transmission of paging messages; and cancel transmission of a previously requested paging message responsive to said indication to cancel transmission of paging messages.

The request to transmit a paging message may be a request to transmit a dummy paging message, and said associated paging message may be a dummy paging message.

According to another aspect, the invention provides a mobile communication device for a communication system comprising a communication node, a plurality of base stations, each configured to operate a cell, and the mobile communication device, wherein: said communication node comprises: means for identifying that paging is required for the mobile communication device; means for obtaining information identifying at least one cell in which said mobile communication device has been located previously and for obtaining further information relating to at least one of: movement of the mobile communication device between cells; and a time when said mobile communication device was located in said at least one cell; means for defining a set comprising at least one cell in which to seek said mobile communication device, based on said information and said further information; and means for initiating transmission of a respective paging message for said mobile communication device in each cell of said set; each base station of said plurality of base stations comprises: means for providing, to the communication node, information relating to the mobile communication device if the mobile communication device is or has previously been located within a cell operated by the base station, wherein said information comprises information identifying said cell operated by the base station and further information relating to at least one of: movement of the mobile communication device into and/or out of the cell operated by the base station; and a time when said mobile communication device was located in said cell operated by the base station; means for receiving a request from the communication node to transmit a paging message for the mobile communication device, wherein said paging request is transmitted by the communication node based on the information and further information provided by the base station; and means for transmitting an associated paging message for said mobile communication device in said cell operated by the base station in response to the request received from the communication node; and said mobile communication device is operable to receive a paging message sent by a base station of said plurality of base stations in response to a paging request from said communication node and to respond to said paging message with a connection request.

According to another aspect, the invention provides a communication system comprising a communication node, a plurality of base stations, each configured to operate a cell, and at least one mobile communication device, wherein: said communication node comprises: means for identifying that paging is required for the mobile communication device; means for obtaining information identifying at least one cell in which said mobile communication device has been located previously and for obtaining further information relating to at least one of: movement of the mobile communication device between cells; and a time when said mobile communication device was located in said at least one cell; means for defining a set comprising at least one cell in which to seek said mobile communication device, based on said information and said further information; and means for initiating transmission of a respective paging message for said mobile communication device in each cell of said set; each base station of said plurality of base stations comprises: means for providing, to the communication node, information relating to the mobile communication device if the mobile communication device is or has previously been located within a cell operated by the base station, wherein said information comprises information identifying said cell operated by the base station and further information relating to at least one of: movement of the mobile communication device into and/or out of the cell operated by the base station; and a time when said mobile communication device was located in said cell operated by the base station; means for receiving a request from the communication node to transmit a paging message for the mobile communication device, wherein said paging request is transmitted by the communication node based on the information and further information provided by the base station; and means for transmitting an associated paging message for said mobile communication device in said cell operated by the base station in response to the request received from the communication node.

According to another aspect, the invention provides a method performed by a communication node for a communication network, the method comprising: identifying that paging is required for a mobile communication device; obtaining information identifying at least one cell in which said mobile communication device has been located previously and obtaining further information relating to at least one of movement of the mobile communication device between cells and a time when said mobile communication device was located in said at least one cell; defining a set comprising at least one cell in which to seek said mobile communication device, based on said information and said further information; and initiating transmission of a respective paging message for said mobile communication device in each cell of said set.

According to another aspect, the invention provides a method performed by a communication node for a communication network, the method comprising: identifying that paging is required for a mobile communication device; obtaining information identifying at least one cell in which said mobile communication device has been located previously; defining a number of sets, each set comprising at least one cell in which to seek said mobile communication device, based on said obtained information; and initiating transmission of a respective paging message for said mobile communication device in each cell of the number of sets and for specifying a respective time period after which said transmission should occur; wherein said respective time period is specified in dependence on which set comprises the cell in which each paging message is to be transmitted.

According to another aspect, the invention provides a method performed by a base station operable to transmit paging messages in a cell of a communication network, the cell operated by the base station, the method comprising: providing, to a communication node, information relating to a mobile communication device if the mobile communication device is or has previously been located within the cell, wherein said information comprises information identifying said cell and further information relating to at least one of: movement of the mobile communication device into and/or out of the cell; and a time when said mobile communication device was located in the cell; receiving a request from the communication node to transmit a paging message for the mobile communication device, wherein said paging request is transmitted by the communication node based on the information and further information provided by the base station; and transmitting an associated paging message for said mobile communication device in the cell in response to the request received from the communication node.

According to another aspect, the invention provides a method performed by a mobile communication device for a communication system comprising a communication node, a plurality of base stations, each configured to operate a cell, said method comprising: receiving a paging message sent by a base station of said plurality of base stations in response to a paging request from said communication node; and responding to said paging message with a connection request; wherein the communication node performs the steps of: identifying that paging is required for the mobile communication device; obtaining information identifying at least one cell in which said mobile communication device has been located previously and obtaining further information relating to at least one of: movement of the mobile communication device between cells; and a time when said mobile communication device was located in said at least one cell; defining a set comprising at least one cell in which to seek said mobile communication device, based on said information and said further information; and initiating transmission of a respective paging message for said mobile communication device in each cell of said set; and wherein each base station of said plurality of base stations performs the steps of: providing, to the communication node, information relating to the mobile communication device if the mobile communication device is or has previously been located within a cell operated by the base station, wherein said information comprises information identifying said cell operated by the base station and further information relating to at least one of: movement of the mobile communication device into and/or out of the cell operated by the base station; and a time when said mobile communication device was located in said cell operated by the base station; receiving a request from the communication node to transmit a paging message for the mobile communication device, wherein said paging request is transmitted by the communication node based on the information and further information provided by the base station; and transmitting an associated paging message for said mobile communication device in said cell operated by the base station in response to the request received from the communication node.

According to another aspect, the invention provides a method performed in a communication system comprising a communication node, a plurality of base stations, each configured to operate a cell, and at least one mobile communication device, said method comprising: at the communication node: identifying that paging is required for the mobile communication device; obtaining information identifying at least one cell in which said mobile communication device has been located previously and obtaining further information relating to at least one of: movement of the mobile communication device between cells; and a time when said mobile communication device was located in said at least one cell; defining a set comprising at least one cell in which to seek said mobile communication device, based on said information and said further information; initiating transmission of a respective paging message for said mobile communication device in each cell of said set; at a base station: providing, to the communication node, information relating to the mobile communication device if the mobile communication device is or has previously been located within a cell operated by the base station, wherein said information comprises information identifying said cell operated by the base station and further information relating to at least one of: movement of the mobile communication device into and/or out of the cell operated by the base station; and a time when said mobile communication device was located in said cell operated by the base station; receiving a request from the communication node to transmit a paging message for the mobile communication device, wherein said paging request is transmitted by the communication node based on the information and further information provided by the base station; and transmitting an associated paging message for said mobile communication device in said cell operated by the base station in response to the request received from the communication node.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF THE DRAWINGS

Exemplary embodiments of the invention will now be described, by way of example, with reference to the accompanying drawings in which:

FIG. 1b illustrates schematically an exemplary logical architecture for the telecommunication system illustrated in FIG. 1a;

FIG. 1c illustrates schematically an exemplary overall architecture for the telecommunication system illustrated in FIG. 1a;

FIG. 3 illustrates schematically the main components of a UE of the telecommunication system of FIG. 1a;

FIG. 4 shows a block diagram illustrating the main components of a home base station of the telecommunication system of FIG. 1a;

FIG. 5 shows a block diagram illustrating the main components of a home base station gateway of the telecommunication system of FIG. 1a;

DETAILED DESCRIPTION OF EXEMPLARY EMBODIMENTS

Although for efficiency of understanding for those of skill in the art, embodiments and implementations of the invention will be described in detail in the context of a 3G system (UMTS, LTE), the principles of the invention can be applied to other systems (such as WiMAX) in which mobile devices or User Equipment (UE) communicate with one of several base stations with the corresponding elements of the system changed as required.

Overview

Figure 1A:
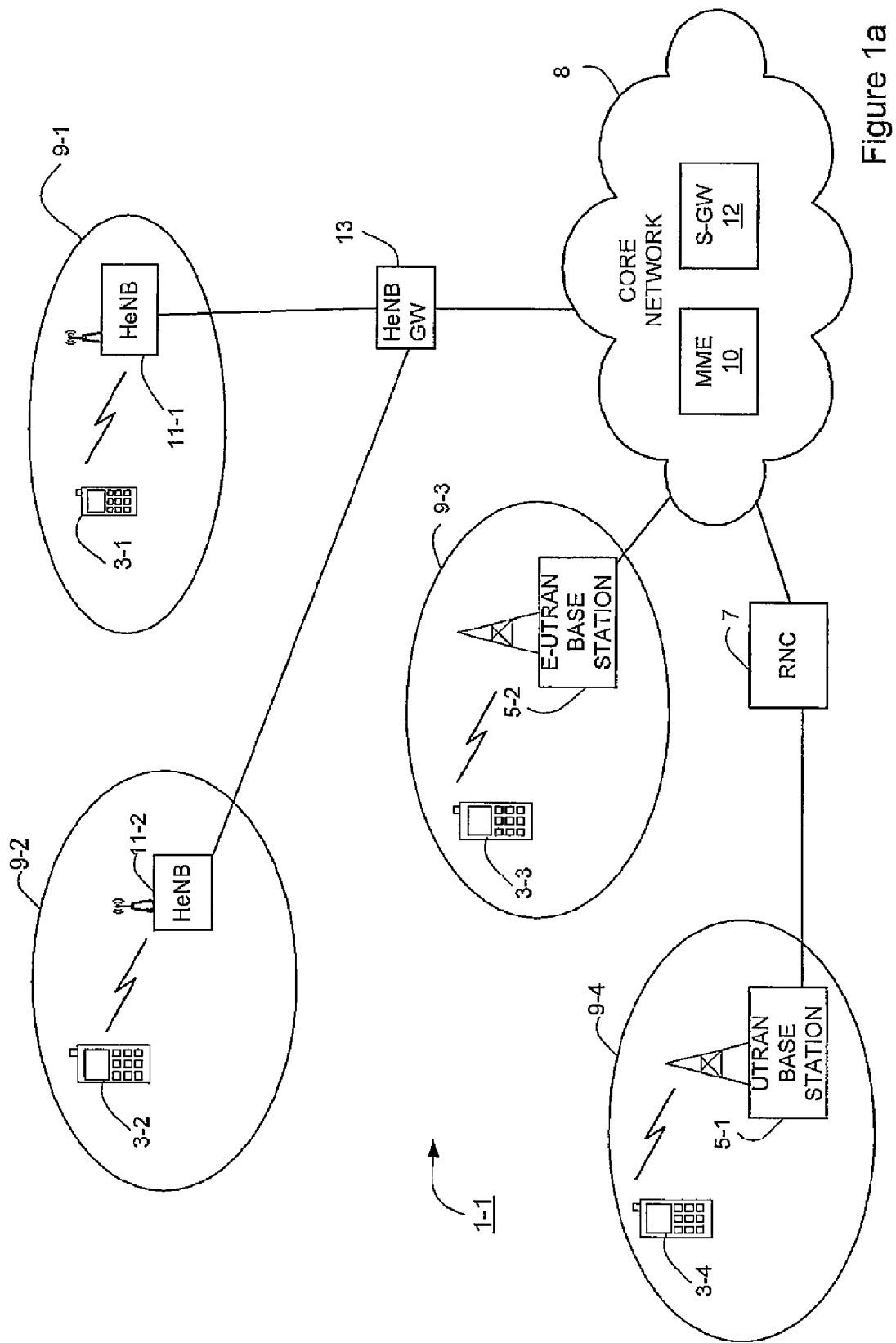
FIG. 1a illustrates schematically a telecommunication system.

FIG. 1a schematically illustrates a mobile (cellular) telecommunication system 1-1 in which users of User Equipments (UE) (such as mobile telephones or other mobile communication devices) 3-1 to 3-4 can communicate with other users via different access nodes. In particular, UEs 3 can make connections with the mobile telephone core network 8 directly via a Universal Terrestrial Radio Access Network (UTRAN) 'macro' base station 5-1 and associated Radio Network Controller (RNC) 7 or an evolved UTRAN (E-UTRAN) base station 5-2. Specifically, UE 3-3 is located within cell 9-3 operated by E-UTRAN 'macro' base station 5-2 and can therefore connect to core network 8 via E-UTRAN base station 5-2. UE 3-4 is located within cell 9-4 operated by UTRAN base station 5-1 and can therefore connect to core network 8 via UTRAN base station 5-1. UEs 3 can also connect to the mobile telephone core network 8 using a 'home' base station (HNB). In this embodiment, the home base stations are LTE home base stations (HeNB) and are coupled, by a gateway HeNB GW 13, to the mobile telephone core telephone network 8. HeNB 11-1 operates femtocell 9-1 in which UE 3-1 is located, and therefore UE 3-1 can connect to the core network 8 via HeNB 11-1. HeNB 11-2 operates femtocell 9-2 in which UE 3-2 is located, and therefore UE 3-2 can connect to core network 8 via HeNB 11-2.

A mobility management entity (MME) 10 in the core network 8 maintains information for tracking each UE 3 and controls paging of a UE when a connection is required. The MME 10 is also involved in the activation and deactivation of communication bearers and in the selection of a Serving Gateway S-GW 12 for a UE 3 when the UE 3 initially attaches to the network and during handover involving Core Network (CN) node relocation. The S-GW 12 is configured to route and forward user data packets.

In the example of FIG. 1a, HeNBs are programmed with the IP address of a security gateway (not shown) within the core network 8 so that the HeNBs initially connect to the preprogrammed security gateway. A Domain Name Server (DNS) (not shown) within the core network 8 assigns an IP address to each HeNB 11 which the HeNB 11 uses in its communications with HeNB GW 13.

Figure 2:
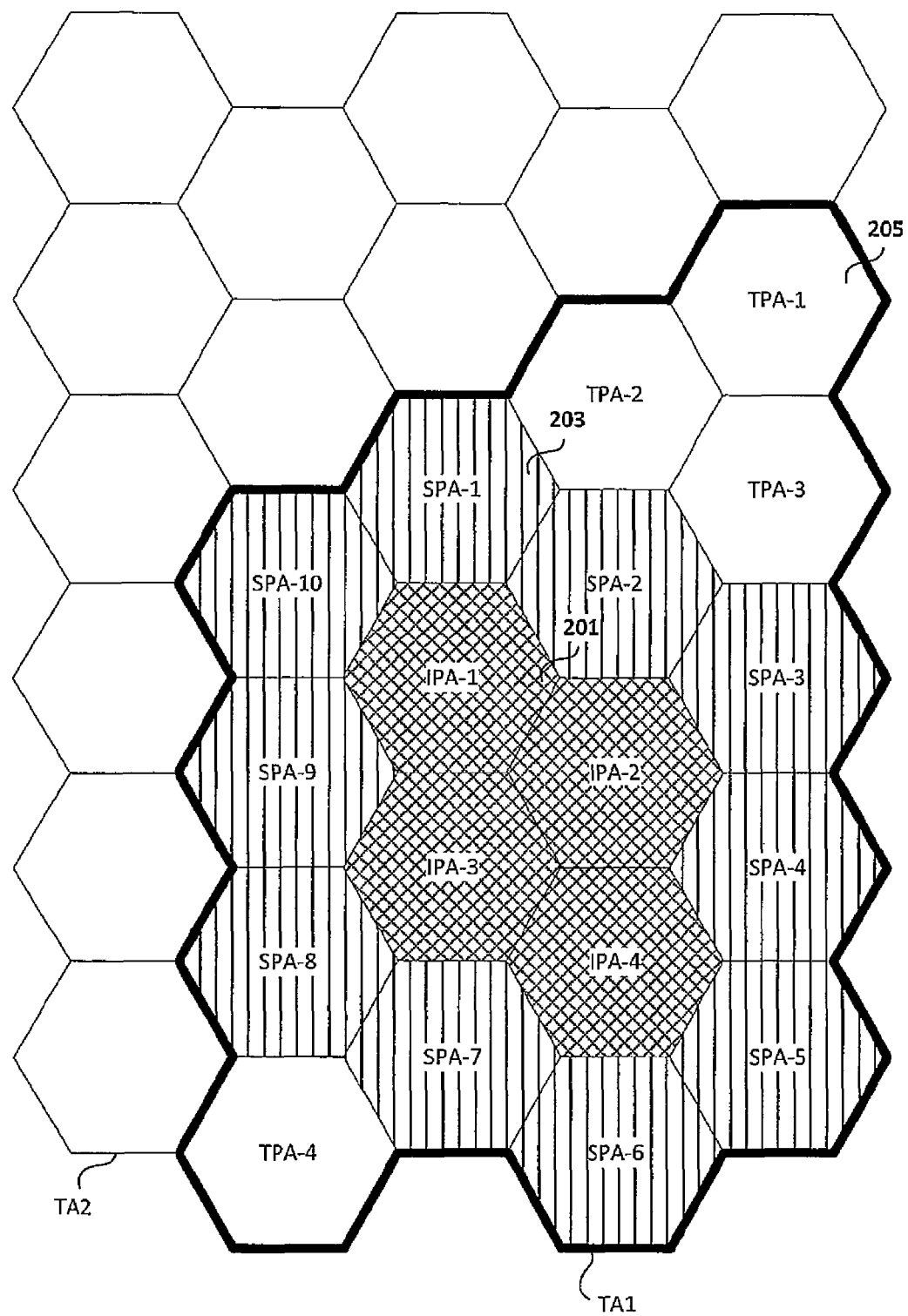
FIG. 2 illustrates schematically a network of cells forming two tracking areas.

In this embodiment, it will be assumed, for the sake of simplicity of explanation, that each UE 3 communicates with only one base station 5 or home base station 11 at a time, although, in deployed systems, a UE 3 might communicate with several base stations or home base stations while remaining in connected mode. It will be appreciated that although a limited number of macro and home base stations 5, 11, and associated macro cells or femtocells 9 are shown in FIG. 1a for the sake of simplicity, the communication system 1-1 can comprise any number of base stations and/or any number of associated cells 9 for example as illustrated in FIG. 2.

Figure 1B:
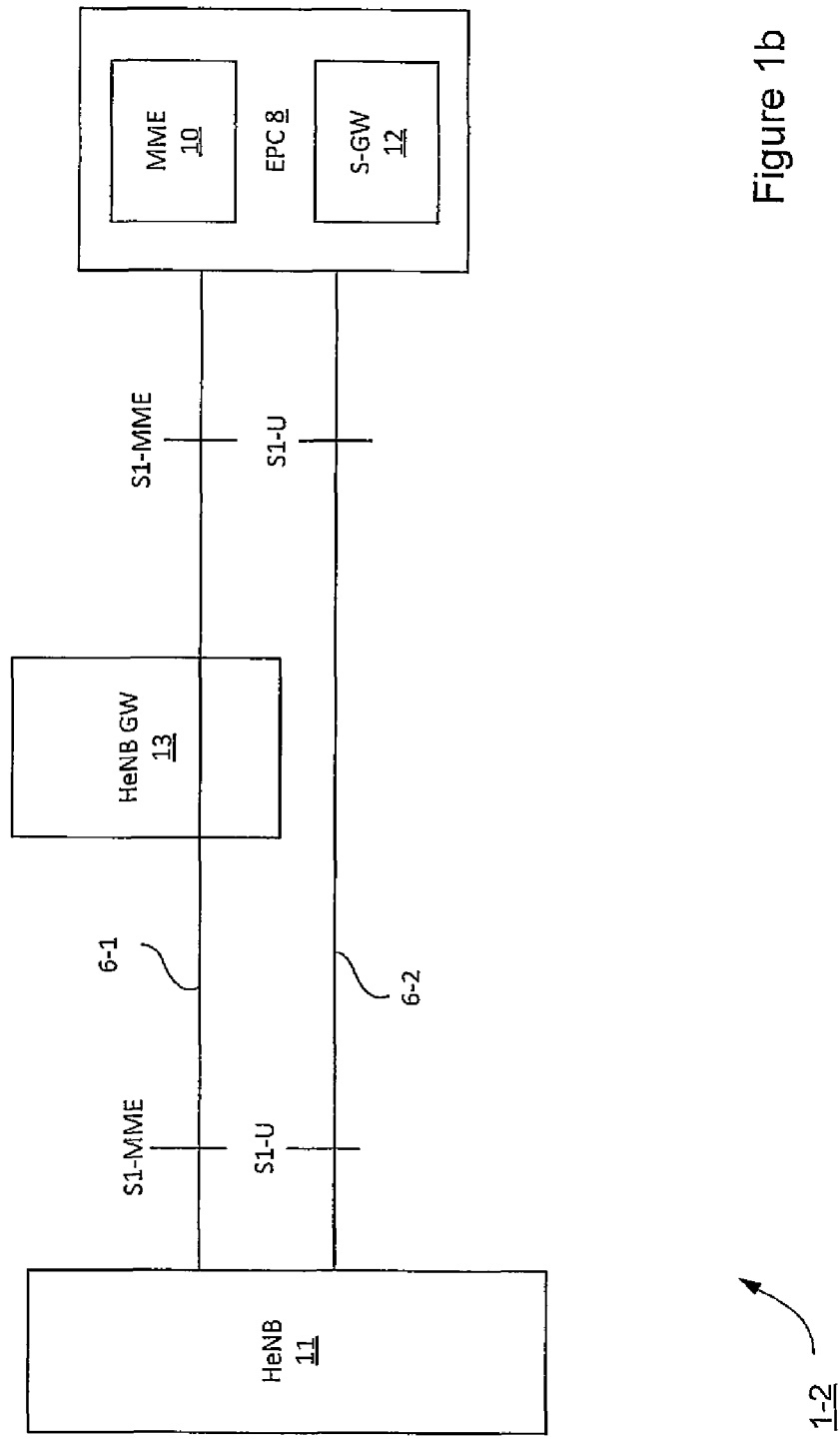

In FIG. 1b, a schematic illustration of an exemplary logical architecture for the communication system illustrated in FIG. 1a is shown generally at 1-2. As shown, the HeNB 11 is connected to the core network 8, which in this example is shown as an Evolved Packet Core (EPC) 8, via a set of S1 interfaces S1-MME 6-1 and S1-U 6-2. The S1-MME interface 6-1 carries Control Plane (C-Plane) traffic, comprising control data, between the HeNB 11 and the MME 10 of the core network 8 via the HeNB GW 13. The S2-U interface 6-2 carries User Plane (U-Plane) traffic, comprising user data, between the HeNB 11 and the core network 8, and in this example the S1-U interface 6-2 provides a direct logical U-Plane connection between HeNB 11 and the S-GW 12 of core network 8. As shown, an S1 interface 6 can provide an interface between the HeNB GW 13 and the Core Network 8, between the HeNB 11 and the HeNB GW 13, and between the HeNB 11 and the Core Network 8.

The HeNB GW 13 can provide a connection for any number of HeNBs to the core network 8.

Figure 1C:
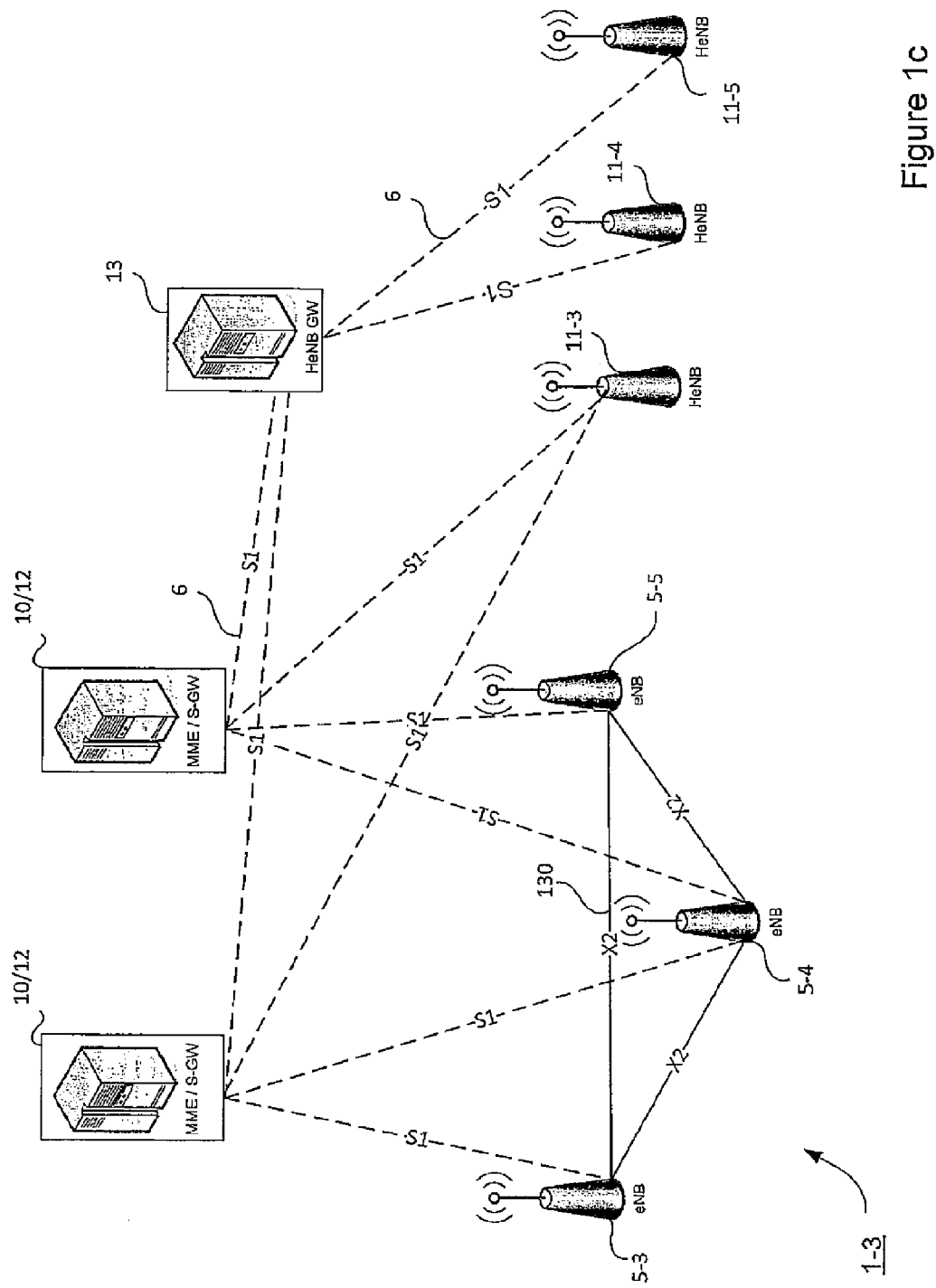

In FIG. 1c, a schematic illustration of an exemplary overall architecture for the communication system illustrated in FIG. 1a is shown generally at 1-3. As shown, E-UTRAN 'macro' base stations (eNBs) 5-3 to 5-5 are connected to an MME 10 and an S-GW 12 via an S1 interface 6. HeNBs 11-3 to 11-5 are also connected to an MME 10 and a S-GW 12 via an S1 interface 6, however HeNBs 11 may either be directly connected to MME 10 and S-GW 12 or via HeNB GW 13. The eNBs 5 are configured to communicate with one another via an X2 interface 130.

FIG. 2 shows a plurality of cells forming part of a communication system as described in FIG. 1a. Each cell is represented as a hexagonal area and forms part of a respective group (or 'tracking area' (TA) of cells). Specifically, the cells shown in FIG. 2 form two groups: Tracking Area 1 (TA1) and Tracking Area 2 (TA2). In this embodiment, the cells are LTE femtocells 9, and therefore each cell 9 is operated by a HeNB 11, and in turn the HeNBs 11 are controlled by at least one HeNB GW 13 although it will be appreciated that in a deployed system each TA may comprise a mixture of macro cells and/or femtocells 9. When a UE 3 is in idle mode, the MME 10 maintains information identifying the location of the UE 3 at the granularity of a Tracking Area but does not maintain information sufficient to identify precisely which cell of the tracking area a UE is located in at any particular time.

Advantageously, according to the present invention, in order to establish communications with a UE 3, a paging request is not necessarily sent to all the cells of the TA(s) present on a TA list associated with the UE 3 and maintained at the MME 10, but to a set of cells which is defined, dynamically, based on information, such as historical information, relating to the UE 3 being paged. In the example shown in FIG. 2, a paging request is initially sent, from the appropriate HeNB gateway(s) 13, to each of the HeNBs 11 operating a cell in a dynamically defined initial paging area (IPA) 201. The initial paging area (IPA) 201 comprises cells IPA-1 to IPA-4 which form, in this example, a subset of the cells of the tracking area TA1. In response to receiving a paging request from the HeNB GW 13, a HeNB 11 of a cell 9 in the IPA will transmit a corresponding paging message for the UE 3 in each cell of the IPA that it operates.

If a response is received from the UE 3 being paged, the transmission of paging requests by the HeNB GW 13 and paging messages by the HeNBs 11 is stopped. Therefore, in this example, use of signalling overhead is minimised, because any HeNBs 11 which have yet to transmit a paging message will not have to transmit a paging message. For example, if a response from the UE is received by cell IPA-1, then only the four cells of the IPA will have sent paging messages, and signalling overhead in the remaining cells is minimised.

Subsequently, if a response to the paging messages sent in the IPA is not received, a paging request is sent from the appropriate HeNB gateway(s) 13, to each of the HeNBs 11 operating a cell in a subsequent paging area, which is dynamically defined based on the UE related information and, in this example, comprises a secondary paging area (SPA) 203 formed by cells SPA-1 to SPA-10. Finally, if a response to the paging messages sent in the SPA is not received, a paging request is sent from the appropriate HeNB gateway(s) 13, to each of the HeNBs 11 operating a cell in a further paging area, which is also dynamically defined based on the UE related information and, in this example, comprises a tertiary paging area (TPA) 205 comprising cells TPA-1 to TPA-4.

The UE related information on which the dynamic definition of the paging areas is based typically comprises information relating to the location of the UE, for example the cell which the UE was most recently connected to, in order to maximise the likelihood of receiving a response from the UE at a cell of the paging area. Beneficially, the UE related information on which the dynamic definition of the paging areas is based may also include additional information obtained by the HeNB GW 13. As explained in more detail below, the additional information can include, for example, any combination of the following:

(a) information relating to the movement of the UE 3 between cells of the TA(s) (referred to as UE 'mobility' information) such as information identifying cells in which the UE has historically been located and/or historic timing information relating to the time at which the UE was located in those cells;

(b) further timing information such as information identifying the time of day the current paging requests/messages are to be sent;

(c) neighbouring cell information relating to cells in the geographic vicinity of one or more cells in which the UE has been historically located;

(d) 'dummy paging' information relating to the UE acquired as a result of response (or lack of response) by the UE to non-connection related or 'dummy' paging messages sent to establish whether or not a UE is in a particular cell or group of cells; and/or (e) other such information.

Using such additional information when defining a paging area means that the dynamic definition of the paging area can be carried out more efficiently to target cells in which the UE is likely to be located more precisely.

User Equipment

Figure 3:
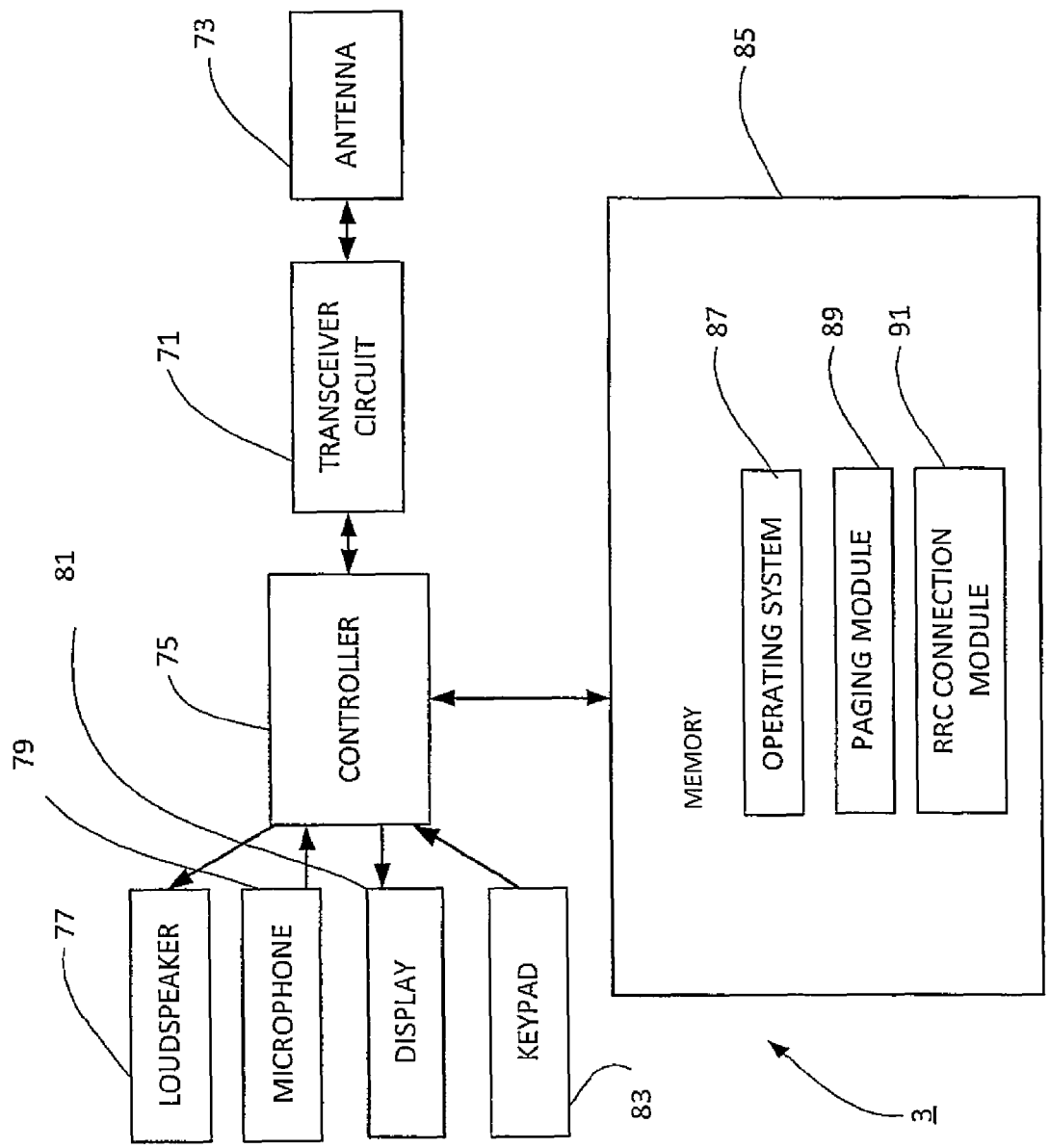

FIG. 3 illustrates schematically the main components of a UE 3 shown in FIG. 1a. As shown in FIG. 3, each UE 3 includes a transceiver circuit 71 to transmit signals to and to receive signals from the base stations 5 or 11 via one or more antennae 73. As shown, the UE 3 also includes a controller 75 to control the operation of the UE 3. The controller 75 is connected to the transceiver circuit 71 and to a user interface having, in this example, a loudspeaker 77, a microphone 79, a display 81, and a keypad 83. The controller 75 operates in accordance with software instructions stored within memory 85. As shown, these software instructions include, among other things, an operating system 87, a paging module 89 for processing received paging messages from a HeNB and for controlling responses to such messages, along with an RRC connection module 91 for controlling the establishment of an RRC connection via a HeNB.

Home Base Station

Figure 4:
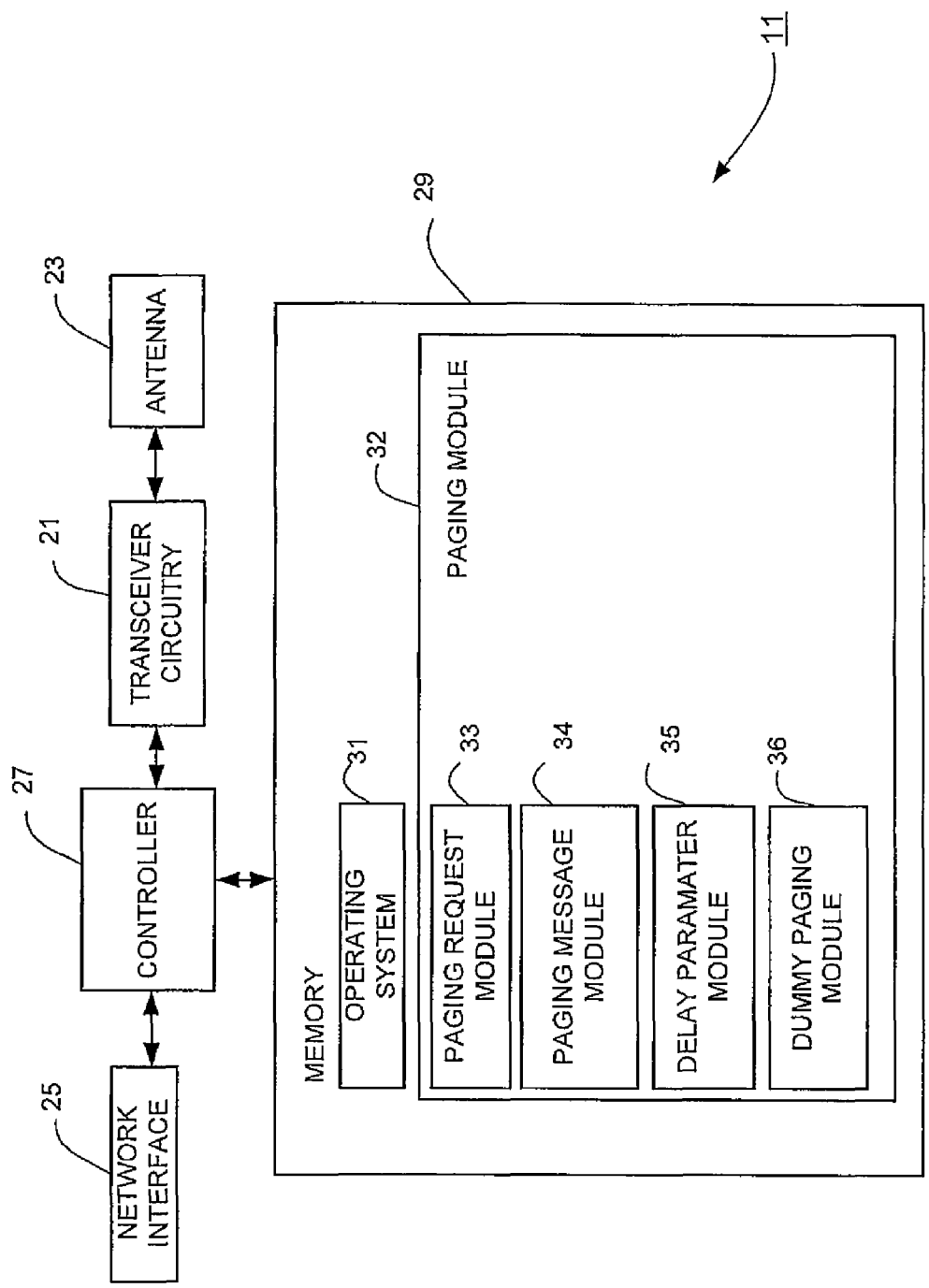

FIG. 4 shows a block diagram illustrating the main components of a HeNB base station 11. As shown in FIG. 4, each HeNB 11 comprises a transceiver circuit 21 to transmit signals to and to receive signals from the UEs 3 via one or more antennae 23 and to transmit signals to and to receive signals from the telephone network via a network interface 25 (e.g. via a HeNB GW 13). The transceiver circuit 21 is controlled by a controller 27 in accordance with software stored in memory 29. The software includes, among other things, an operating system 31 and a paging module 32.

The paging module 32 processes paging requests from the network (e.g. from the HeNB GW 13) and manages the transmission of associated paging requests in the cell(s) that the HeNB 11 operates. Specifically, the paging module comprises a paging request module 33 for processing received paging requests received from the HeNB GW 13; a paging message module 34 for controlling the generation and transmission of a paging message for a UE 3; a delay parameter module 35 for processing a delay parameter received from the HeNB GW 13; and a dummy paging module 36 for controlling the transmission of dummy paging messages and rejection of any resulting connection attempts by a UE 3.

Home Base Station Gateway

Figure 5:
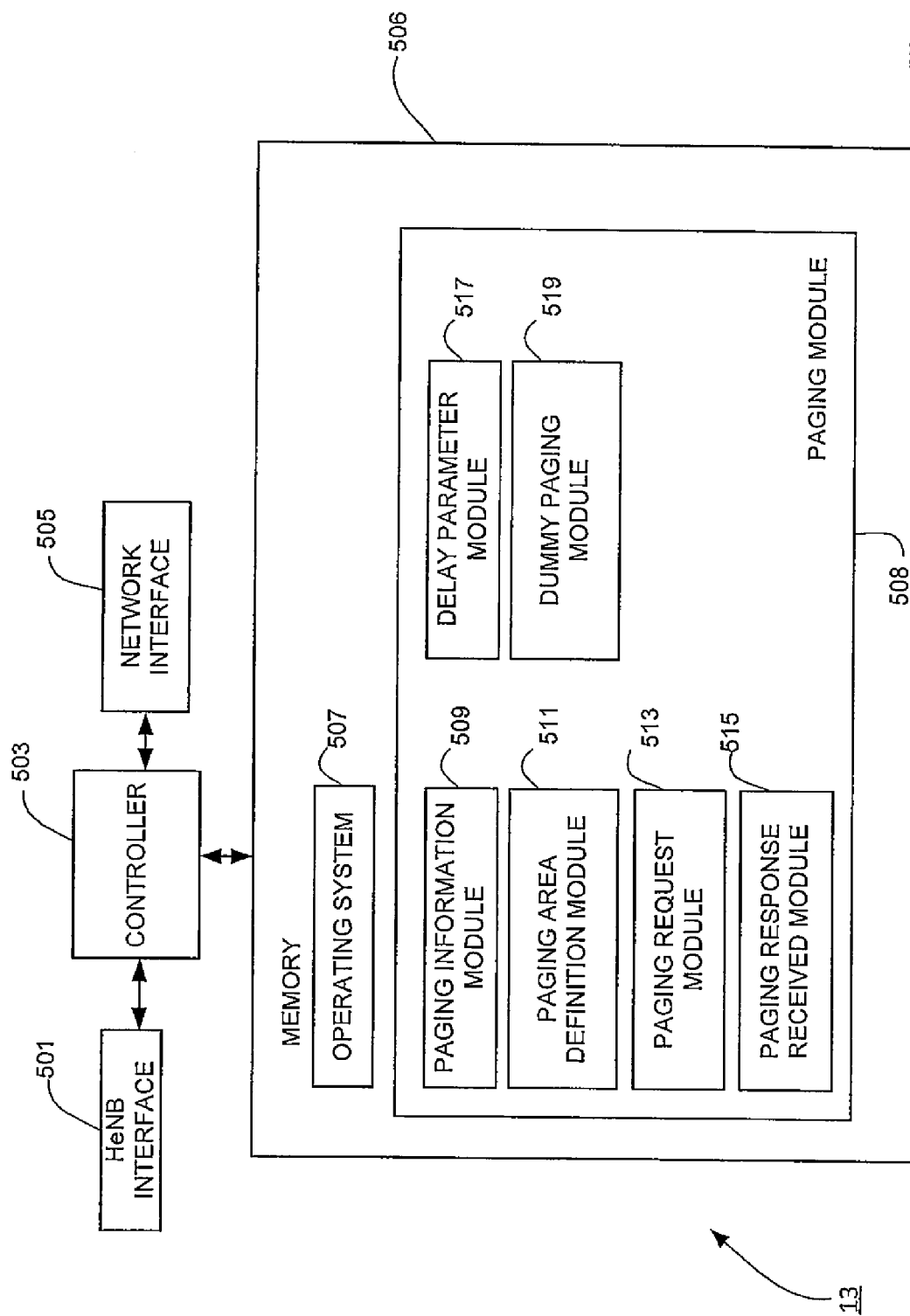

FIG. 5 illustrates schematically the main components of a HeNB Gateway (GW) 13 as shown in FIG. 1a. The HeNB GW comprises a HeNB interface 501 for transmitting signals to and receiving signals from one or more HeNBs and a network interface 505 for transmitting signals to and receiving signals from the broadband access network 15 and core network 8. A controller 503 controls the operation of the HeNB interface 501 and network interface 505, along with controlling the overall functioning of HeNB GW 13. The controller 503 operates in accordance with software instructions stored in memory 506. As shown, these software instructions comprise an operating system 507 and a paging module 508.

The paging module 508 manages the transmission of paging requests (e.g. to the HeNB 11) and the definition of the paging area(s) in which paging messages are to be sent. Specifically, the paging module comprises a paging information module 509 for acquiring and maintaining the UE related information on which paging area definition is based including, for example, the location and/or other types of information described above for use in selecting cells to form a paging area, such as an initial paging area (IPA). The paging information module passes this information to a paging area definition module 501 for defining the one or more paging areas based on the UE related information.

The paging module 508 also comprises a paging request module 513, for controlling the generation and transmission of the paging requests from the HeNB GW to HeNBs in accordance with the paging area(s) defined by the paging area definition module 511. Furthermore, the paging module 508 also comprises a paging response received module 515 for receiving a notification from a HeNB that a paging response has been received by the HeNB, and controlling the response to such a notification, such as the generation and transmission of a paging cancel message, as described in greater detail below.

The paging module 508 further comprises a delay parameter module 517 for defining one or more appropriate delay parameters for setting a delay at which the HeNBs should send a particular requested paging message.

The paging module 508 further comprises a dummy paging module 519 for configuring dummy paging to be performed by one or more HeNBs 13 and receiving dummy paging information as explained in more detail below.

Multi Step Paging

Figure 6:
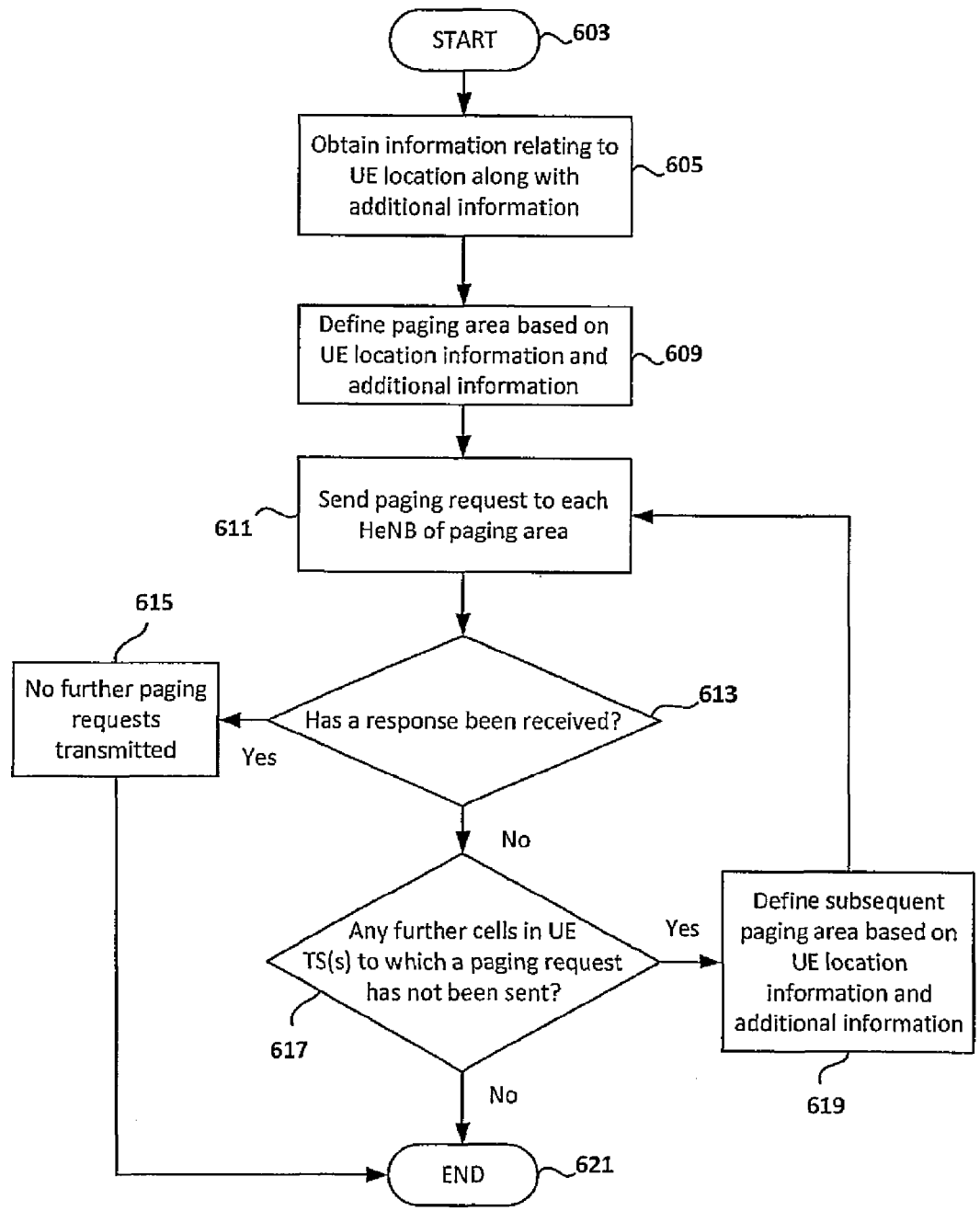
FIG. 6 is a flow diagram illustrating a method according to an exemplary embodiment.

FIG. 6 is a flow diagram illustrating a multi step paging method performed by a HeNB GW for establishing communications with a particular UE according to one embodiment.

The method starts at step 603 when it is determined that paging is required for a particular UE 3. At step 605, the HeNB GW 13 obtains information relating to the UE's location, along with additional information which allows the HeNB GW 13 to optimise the selection of cells for paging areas.

As explained above, the UE related information comprises location information identifying a cell in which the UE was previously located, for example a cell in which the UE previously responded to paging and/or a cell in which the UE most recently had an RRC Connection. The location information comprises information identifying the cell, for example the cell ID of the cell. The location information may also comprise geographic location information such as the UE's coarse, network-based, location (determined via the UE communicating with nearby base stations) and/or satellite positioning information such as global positioning system (GPS) derived geographic location information.

In this embodiment, the UE location information used by the HeNB GW 13 to define a paging area comprises UE location information which the HeNB GW 13 has previously received from one or more of the HeNBs 11 with which it can communicate and which the HeNB GW 13 has stored in memory. The stored UE location information is associated with a UE identifier, such as an S-Temporary Mobile Subscriber Identity (S-TMSI), in order to allow the HeNB GW 13 to identify location information associated with a particular UE. Optionally, the stored UE location is also associated with time information, such as a time stamp for the last RRC connection made by the UE.

In this embodiment, the HeNB GW 13 obtains additional information as well as the UE location information identifying a cell in which the UE was previously located.

The additional information may comprise further, historic, UE location information, providing details on the UE's location prior to its most recent RRC connection or most recent paging response (for example identifying where the UE has been when in a connected mode). The historic UE location information effectively provides an indication of the cellular movement of the UE between cells and hence the level of mobility of the UE (for example whether it has a high mobility (e.g. moving relatively quickly between cells) or a low mobility (e.g. moving relatively slowly between cells or not moving). Using such historical information when defining a paging area is particularly beneficial because the historical information allows predictions to be made regarding the UE's future movements. For example if, for the past hour, the UE has been moving around a small group of adjacent cells, for instance if the user of the UE is browsing a department store, then there is a fair probability that the UE will have remained within the small group of cells or will not have travelled far from them.

The additional information may also advantageously include further mobility related information for use in identifying the level of UE mobility based on the geographical and/or cellular movement of a UE. The further mobility related information may be derived from indications that a mobility event has occurred for example, in connected mode, the receipt of specific S1-AP messages by the HeNB or other communication node. Theses message may include, for example, a message indicating movement of the UE between cells such as a HO REQUIRED message, a PATH SWITCH message, a UE CONTEXT SETUP message, and/or a UE CONTEXT RELEASE message. From such types of messages, the HeNB GW 13 is able to derive mobility related information for the UE and to maintain historic mobility information over time. For example, a large number of HO REQUIRED messages received over a short time indicates that a UE is moving rapidly. In this case, a UE may be a mobile phone being used for a phone call by a fast moving user. In this situation, the UE will be moving rapidly and experiencing frequent handovers as it leaves one cell and enters another.

When the UE is in idle mode, the UE stores information about the idle mode mobility, such as the cells or tracking areas in which the UE has been located, and upon connection to the mobile network the UE provides this information in a measurement report (e.g. a logged Minimisation of Drive Tests (MDT) report). This idle mode mobility related information may be sent to the HeNB GW 13 in a message on the S1 interface between HeNB 11 and HeNB GW 13. Additionally or alternatively the HeNB GW 13 may retrieve the information from a TCE (Trace Control Entity).

The additional information obtained by the HeNB GW 13 may also comprise timing information. For example, the timing information may include the time expired after the UE's most recent RRC connection. In one embodiment, where an RRC connection is released for a UE 3, the HeNB GW 13 will start an Operations and Maintenance (O&M) configured timer. The timer is associated with information identifying a particular UE 3 and information identifying the cell in which the most recent UE RRC connection has occurred. When the HeNB GW 13 commences a paging procedure (e.g. to establish communications with the UE) the timer value is used when determining whether to include the cell associated with the timer in a paging area. For example, if the timer value is below a first threshold, the HeNB GW 13 will include the cell in an initial paging area. If the value of the timer is greater than the first threshold, the cell may instead be included in a subsequent paging area.

The timing information may comprise information identifying the time at which a paging procedure is commenced by the HeNB GW 13 or at which a paging request is to be sent by the HeNB 11 (e.g. relating to the time of day locally, and the date or day of the week (possibly in the format hh:min:sec)) and/or the time at which a response is received from a UE. Obtaining this timing information, such as time of day and date, is advantageous as such factors can effect a UE's location and mobility. For example, low mobility can be assumed during working hours and night hours.

At step 609, the HeNB GW 13 defines a paging area based on the UE location information and the additional information. For example, an initial paging area may be defined, comprising the cell where an RRC Connection was last established with the UE, along with a set of neighbouring (or nearby) cells selected based on the UE's past mobility. For example, if the UE was in a low mobility state, only the cells immediately adjacent to the most recent RRC connection (or paging response) cell are selected for the paging area whereas if the UE was in a high mobility state cells further away from the most recent RRC connection (or paging response) cell are selected.

At step 611, the HeNB GW 13 sends a paging request to each of the HeNBs which operate the cells selected for the paging area. As a result, each HeNB will transmit a paging message for the UE, and if a response is received the HeNB will notify the HeNB GW 13. At step 613, if it is determined that a response has been received from the UE 3 by a HeNB 11, then it is inferred that the UE 3 is located within the cell operated by that HeNB 11, and at step 615 no further paging requests are transmitted, and the method ends at step 621. If no responses are received by any of the HeNBs of the IPA, then the method proceeds to step 617, where it is determined whether there are any further cells in the TA list of the UE 3 to which a paging request has not yet been sent. If the answer is no, then the process ends at step 621. If the answer is yes, then a subsequent paging area is defined by selecting cells from the TA list to which a paging request has not yet been sent, step 619. This selection is made using the UE location and the additional information.

The subsequent paging area may be a subset of the cells to which a paging request has not yet been sent, as illustrated in FIG. 2. Alternatively, the subsequent paging area may comprise all of the cells to which a paging request has not yet been sent. After the subsequent paging area is defined, the method proceeds to step 611, where the HeNB GW 13 sends a paging request to all the HeNBs 11 in the subsequent paging area. The method then proceeds as described above, continuing to follow the flow chart steps until a response has been received or there are no further cells in the TA list to which a paging request has not been sent.

The method of multi step paging is advantageous because it allows paging requests to only be sent to a subset of cells, such as the cells of an initial paging area, therefore using less signalling overhead overall when compared to initiating paging in all the cells present in a TA list. Also, the use of UE location information and additional information in defining a paging areas means that the probability of the UE being present in the paging area is higher than if only one type of information were to be used, such as the location of the last RRC connection. This minimises the use of radio resources, and reduces the occurrence of radio interference in the network.

The paging areas (initial and subsequent areas) are dynamic, and therefore can be created and updated at any time by the HeNB using the UE information available to it at the time of creation/update. As the skilled person will appreciate, defining paging areas using UE location information and additional information is more flexible than using UE location information alone. Even if two UEs last had an RRC connection in the same cell, the initial paging area defined for each of the two UEs would not necessarily be the same because their historical location information and additional information may differ. For example, if one UE was moving quickly while the other UE was stationary, the initial paging area for the quickly moving UE would be larger. For UEs determined to be moving in a particular direction, a paging area may be defined which extends across a greater distance in the direction in which the UE is moving than in a direction perpendicular to the direction of movement.

The inventors have identified that in some situations where a UE is in a high mobility state, it is preferable to use single step paging (paging all cells of a TA substantially simultaneously). This is because when a UE is in a high mobility state, it is more difficult to define an IPA with a sufficiently high probability of containing the UE. Also, the IPA may have to be large, approaching the size of a Tracking Area itself. Therefore, as a further embodiment, the HeNB GW may use the UE mobility information described above to determine whether the UE is in a high mobility state. If the UE is in a high mobility state, then the HeNB GW will use single step paging. If the UE is not in a high mobility state, then the HeNB GW will use multi step paging.

Using Paging with Delay

Figure 7:
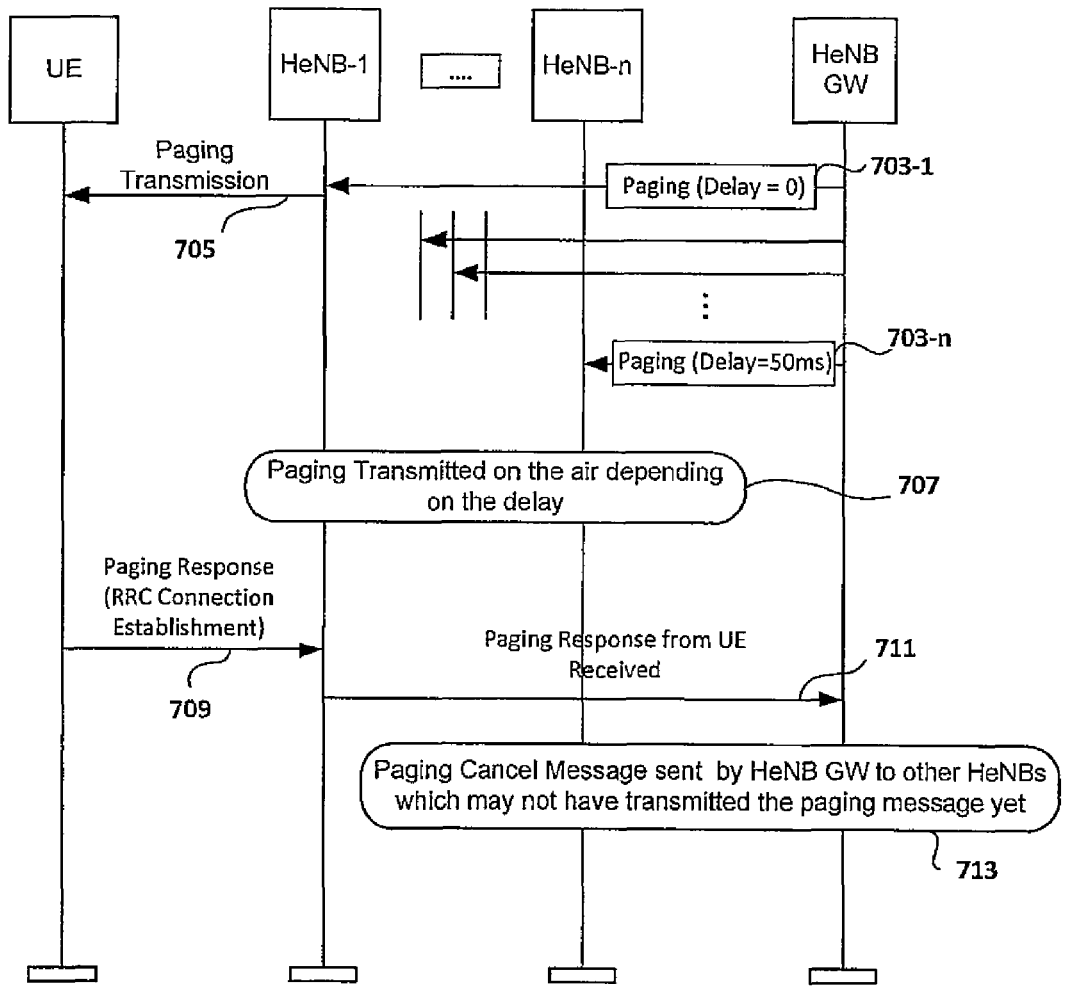
FIG. 7 is a flow diagram illustrating a method according to another exemplary embodiment.

FIG. 7 is a flow diagram illustrating an exemplary embodiment in which the HeNB GW 13 initiates the transmission of a paging message, by a HeNB 11, such that the paging message is sent after a respective time period ('delay'), defined by the HeNB GW 13, for each cell in the TA list of a UE. The delay may range from zero seconds to any defined period of time (typically of the order of tens to hundreds of milliseconds). The HeNB GW 13 does this by sending a paging request including a delay parameter identifying the respective time period for each cell in a TA, to the HeNB 11 that operates that cell.

In this example, where there are n cells present in the TA List of a UE, and it is assumed that each cell is operated by a separate HeNB 11, the HeNB GW 13 is configured to send a paging request to each of n HeNBs 11 as shown. FIG. 7 illustrates that n paging requests, 703-1 to 703-n, are sent to n base stations HeNB-1 to HeNB-n. Each paging request 703 includes a delay parameter which determines the delay between a HeNB 11 receiving the paging request 703 and the HeNB 11 transmitting an associated paging message at step 705. It is noted that all paging messages 703, in this example, are transmitted from the HeNB GW 13 to the HeNBs 11 at substantially the same time, despite the fact that the HeNBs 11 will not necessarily transmit corresponding paging messages at the same time.

At step 707, each HeNB 11 transmits a paging message for the UE depending on the delay parameter. For example, if the delay parameter is set to 0, a paging message will be transmitted by a HeNB 11 substantially immediately, or at least with no additional delay, after receiving the paging request and delay parameter from the HeNB GW 13. If the delay parameter is set to a specified value, for example 50 ms, a receiving HeNB shall start transmitting the paging message after a corresponding delay (e.g. 50 ms).

At step 709, HeNB-1 receives a paging response from the UE 3 and RRC connection establishment occurs. At step 711, HeNB-1 sends a message to the HeNB GW 13 indicating that a response from the UE 3 has been received. The HeNB GW 13 can therefore infer that the UE is located in the cell served by HeNB-1. Subsequently, at step 713 the HeNB GW 13 sends a Paging Cancel Message to the HeNBs 11 on the UE's TA List which may not have yet transmitted a paging message. Paging Cancel Messages are therefore used to cancel any further broadcasting of paging messages, therefore reducing signalling load. In this example, if the HeNB GW receives the paging response received message from HeNB-1 less than 50 ms after the HeNB GW sent the paging request message, HeNB-n will not have transmitted a paging message at the time when the HeNB GW 13 receives the paging response received message, and therefore the HeNB GW 13 will transmit a Paging Cancel Message to HeNB-n.

Beneficially, the HeNB GW 13 defines an initial and any subsequent paging areas based on the UE location related information and additional information as described previously (e.g. with reference to FIGS. 1, 2 and/or 6). The HeNB GW 13 sets the respective delay parameter for each cell of the TA such that the paging messages sent in the cells of the initial paging area are sent at a shorter delay (e.g. zero delay) than the paging messages sent in the cells of the subsequent paging area.

A delay parameter of 0 (or a short delay time) will thus be used where there is a high probability of finding the UE based on the obtained information. A delay parameter specifying a longer time period may be used for HeNBs/cells where the probability of finding the UE in those cells is lower, based on the UE location information and additional information obtained by the HeNB GW 13. Advantageously, this means that it is likely that not all cells in the TA List will have transmitted a paging message at the time that the HeNB GW 13 receives a paging response received message.

It will be appreciated that the above described method of using paging with a delay parameter can be used in conjunction with the method of defining paging areas based on UE location information and additional information as described above. In such an embodiment, one or more paging areas are defined by the HeNB by selecting cells from a UE's TA list. The HeNB selects the delay parameter to be sent to a cell based on the paging area in which the cell is included. Generally, cells in an initial paging area will have zero or very short delay times, while cells of each subsequent paging area will have progressively longer delay times.

Using Dummy Paging at HeNB

Figure 8A:
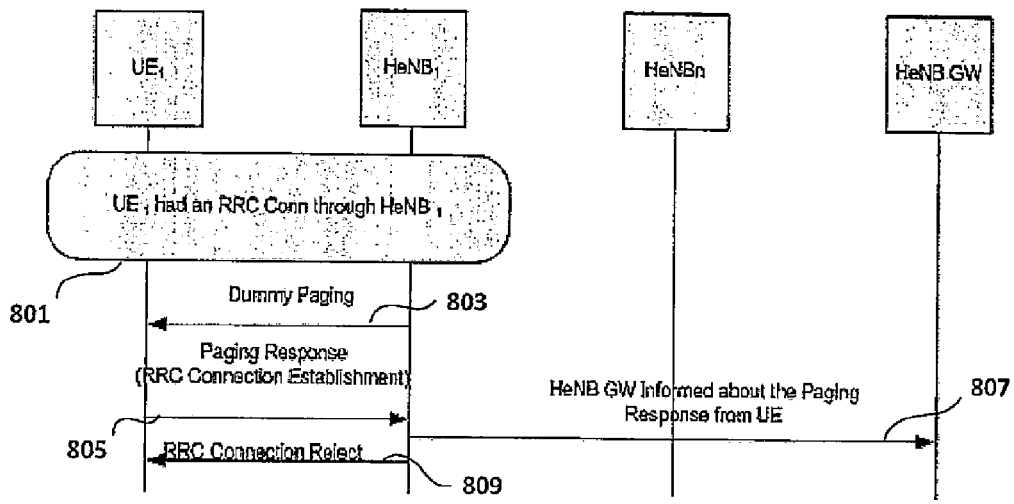
FIGS. 8a and 8b are flow diagrams illustrating a method according to a further exemplary embodiment.
Figure 8B:
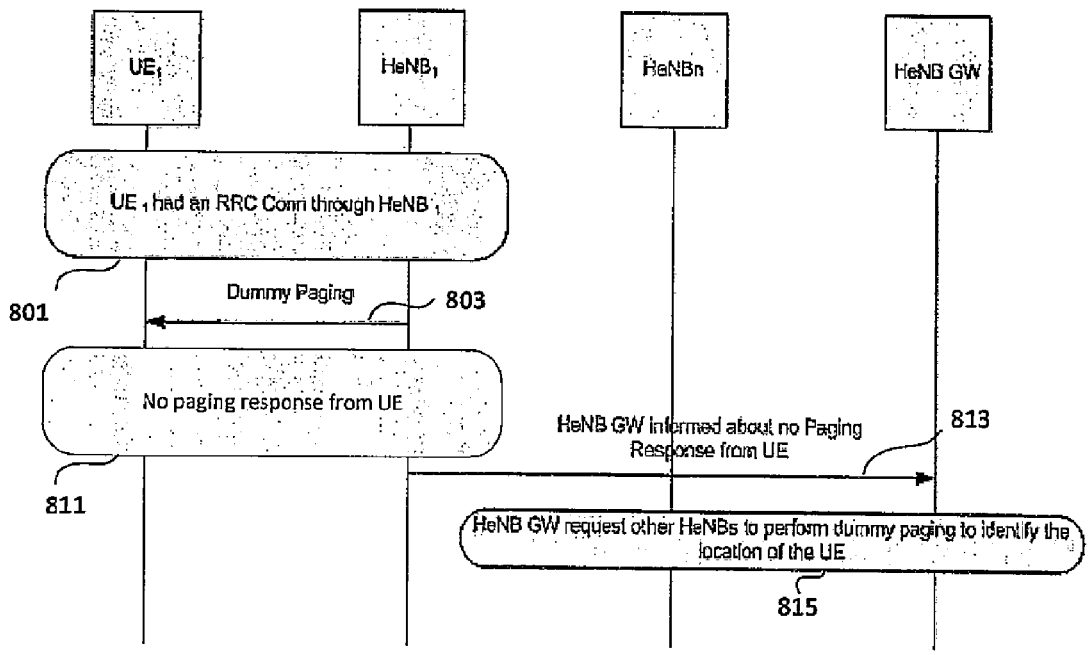

FIGS. 8a and 8b illustrate another embodiment which uses Dummy Paging in order to provide the HeNB GW 13 with information regarding the presence or absence of a UE in a particular cell. A Dummy Paging message is sent by a HeNB periodically for a UE that previously had established a connection, such as an RRC connection, with the HeNB. Dummy paging parameters, such as a periodicity for sending dummy paging messages, may be configured by an Operations & Maintenance (O&M) entity.

At step 801 of FIG. 8a a UE has an RRC connection via HeNB-1. After the RRC connection has ended, the method continues to step 803. At step 803, HeNB-1 is configured to send a dummy paging message to the UE. If the UE responds to the dummy paging message at step 805, HeNB-1 shall inform the HeNB GW about the presence of the UE in its cell at step 807 and send an RRC Connection Reject message to the UE at step 809. As a result, no RRC Connection is established with the UE 3, but the HeNB GW 13 learns of the UE's location within the cell of HeNB-1. The HeNB is configured to repeat the sending of a dummy paging message for the UE 3 at a periodic interval. The HeNB 11 is configured to continue sending dummy paging messages until a response is no longer received from the UE 3, or for a predetermined period of time after the UE's RRC connection with the HeNB 11 has ended or after the last response was received from the UE 3.

However, at step 811 of FIG. 8b, no response from the UE 3 is received by HeNB-1. At step 813, HeNB-1 shall inform the HeNB GW 13 that the UE 3 is not present in its cell, and as a result the HeNB GW 13 determines that it can perform dummy paging in other cells, in step 815.

The HeNB GW 13 can use dummy paging information to optimise the selection of cells for a paging area, or for setting delay parameters. This is useful because embodiments dummy paging allows more up to date information to be stored relating to a UE's last known location. In particular, dummy paging provides more up to date location information than using the last cell in which the UE had an RRC connection.

Advantageously, the cells in which dummy paging messages are sent may be selected based on the UE location related information and additional information as described previously. For example, an initial 'dummy' paging area and subsequent 'dummy' paging area(s) may be defined dynamically based on the UE location related information and additional information. Dummy paging messages may thus be sent initially in the initial dummy paging area and, if no associated paging response is received, subsequently in other paging areas.

Modifications and Alternatives

One or both of the HNB and the HeNB may be replaced with a dual femto access point providing dual functionality of both a HNB and HeNB.

In the communication system illustrated in FIG. 1a, base stations and home base stations may be operable to communicate with one another, via an X2 interface or via other means. The MME 10 may be configured to communicate with both the base stations and home base stations via an S1 interface, and the HeNB GW may configured to communicate with home base stations via an S1 interface.

It will be appreciated that although in FIG. 1a HeNB GW 13 is connected directly to the core network 8, the HeNB may be connected to the core network via a broadband access network (e.g. conforming to the BroadBand Forum, BBF).

In FIG. 1b, a direct logical U-Plane connection between HeNB 11 and the core network 8 is shown. However, the S1-U interface from the HeNB may be terminated at the HeNB GW 13.

In FIG. 2, the cells are LTE femtocells, and therefore each cell is operated by a HeNB. However, the cells can consist of or be a combination of any type of cells, for example regular (macro) cells served by a UTRAN or E-UTRAN base station.

Whilst an IPA comprising four cells of a single TA is shown in FIG. 2, the IPA (or subsequent paging areas) may comprise a single cell or a group of cells, is not necessarily limited to a single TA and, depending on the UE related information, may include all the cells of the TA.

In the embodiment described with reference to FIG. 2, there are three paging areas. In practice, any number of paging areas may be defined, comprising cells from the same or different tracking areas. In particular, only two paging areas may be defined, an initial paging area, as described above, and a secondary paging area comprising all of the remaining cells in the Tracking Area(s) which the UE is registered with.

In FIG. 2, each of the paging areas (i.e. the initial paging area, secondary paging area and tertiary paging area) are a subset of the cells of the tracking area TA1. However, each paging area is not necessarily limited to a single tracking area.

In relation to FIG. 6, the HeNB GW may obtain and store any of the different types of information described, in particular information relating to the UE's location and mobility, and at a later time use this information to define paging area(s). Also, the HeNB GW may optionally use only one type of information when defining a paging area, e.g. using only UE location information or only UE mobility information. The HeNB GW may use UE mobility information to determine whether the UE is in a high mobility state, and use this determination when defining a paging area, optionally using single step paging (paging all cells of a TA substantially simultaneously) when the UE is in a high mobility state.

The HeNB GW may define paging areas based on a prediction of the UE's current or future location, the prediction being made based on the obtained UE location information and additional information as described above, in particular information relating to the movement of the UE between cells. The shape and orientation of the paging area may be dictated by the information relating to the UE's movement between cells, for example if the mobility information indicates that the UE is moving rapidly in a particular direction, an elongate shaped paging area may be defined, positioned to extend in the direction of UE movement.

The HeNB GW 13 may be configured to estimate an expected level of movement of the UE between said cells based on timing information. In particular, determining the time expired since the time at which a paging procedure is commenced by the HeNB GW 13 or at which a paging request is to be sent/received (and also mobility information) allows the HeNB GW 13 to interpolate and/or extrapolate from the UE's last know location to predict current or future locations.

According to FIG. 6, subsequent paging areas are defined, at step 619, after it has been determined whether a response has been received from the UE (step 613) and whether there are any further cells in the TA list to which a paging message has not yet been sent (step 617). However, it will be appreciated that subsequent paging areas may be defined prior to this stage; in particular one or more subsequent paging areas may be beneficially be defined at step 609 when the initial paging area is defined. Defining subsequent paging area(s) at the same time as the initial paging area allows more efficient use of computational resources.

In relation to FIG. 7, the delay parameter may comprise part of the paging request or may be transmitted as a separate message along with the paging request. Preferably, the delay parameter is given in the form of a delay Information Element (IE).

In relation to FIG. 7, it is assumed that each cell is operated by a separate HeNB, and therefore the HeNB GW 13 is configured to send a paging request to n HeNBs. However, those skilled in the art will appreciate that a HeNB may operate more than one cell.

In the above description, reference is made to RRC connections. However, as those skilled in the art will readily appreciate, a UE may instead make a type of connection other than an RRC connection with the HeNB and/or HeNB GW.

In relation to FIG. 8 and the associated description of dummy paging, dummy paging may be initiated by a HeNB for a UE which has previously been connected to the HeNB in an RRC connection, or some other type of connection. Alternatively, the HeNB GW may configure a HeNB to initiate dummy paging for a UE, based on, for example, UE location information and/or other types of information such as UE mobility information and timing information.

Some or all of the functionality of the HeNB GW as described in the above embodiments may instead be provided by the MME 10 or another core network entity, or by a different gateway such as a serving gateway (S-GW). Also, while the invention is described with reference to HeNBs, it will be appreciated that the described invention can equally be used with other network devices such as HNBs, eNodeBs and NodeBs.

For both the UE location information and the additional information, the HeNB GW 13 may collect and store this information in memory, or the HeNB GW 13 may access the information from separate memory, or obtain the information from one or more separate network devices, such at an MME or TCE.

In the above embodiments, a mobile telephone based telecommunications system was described. As those skilled in the art will appreciate, the signaling techniques described in the present application can be employed in other communications system. Other communications nodes or devices may include user devices such as, for example, personal digital assistants, laptop computers, web browsers, etc. As those skilled in the art will appreciate, it is not essential that the above described system be used for mobile communications devices. The system can be used to improve a network having one or more fixed computing devices as well as or instead of the mobile communicating devices.

In the above embodiments, a number of software modules were described. As those skilled in the art will appreciate, the software modules may be provided in compiled or un-compiled form and may be supplied to the node as a signal over a computer network, or on a recording medium. Further, the functionality performed by part or all of this software may be performed using one or more dedicated hardware circuits. However, the use of software modules is preferred as it facilitates the updating of the node in order to update its functionality. Similarly, although the above embodiments employed transceiver circuitry, at least some of the functionality of the transceiver circuitry can be performed by software.

Various other modifications will be apparent to those skilled in the art and will not be described in further detail here.

This application is based upon and claims the benefit of priority from United Kingdom patent application No. 1213711.3, filed on Aug. 1, 2012, the disclosure of which is incorporated herein in its entirety by reference.

What is claimed is:

1. A communication node for a communication network, the communication node comprising:
   a controller, comprising one or more processors, configured to:
      identify that paging is required for a mobile communication device;
      obtain information identifying at least one cell in which said mobile communication device has been located previously, and obtain further information relating to at least one of movement of the mobile communication device between cells and a time when said mobile communication device was located in said at least one cell;
      define a set in which to seek said mobile communication device, based on said information and said further information, the set comprising a first cell which the mobile communication device was most recently connected to and neighbouring cells of the first cell, wherein the neighbouring cells are selected based on said further information relating to at least one of movement of the mobile communication device between cells and the time when said mobile communication device was located in said at least one cell; and
      initiate transmission of a respective paging message for said mobile communication device in each cell of said set.

2. The communication node of claim 1, wherein the controller is further configured to determine whether or not a response has been received from the mobile communication device in response to a paging message for said mobile communication device.

3. The communication node of claim 2, wherein said set comprises a first set, and wherein the controller is further configured to define at least one further set comprising at least one cell in which to seek said communication device, based on said information and said further information.

4. The communication node of claim 3, wherein the controller is further configured to initiate transmission of a respective paging message for said mobile communication device in each cell of said at least one further set if said determining means determines that a response has not been received from the mobile communication device in response to a paging message for said mobile communication device transmitted in a cell of said set.

5. The communication node of claim 3, wherein the controller is further configured to initiate: transmission of a respective paging message for said mobile communication device in each cell of the first set after a first time period; and transmission of a respective paging message for said mobile communication device in each cell of the at least one further set after at least one other time period which is longer than said first time period.

6. The communication node of claim 5, wherein the controller is further configured to cancel, prior to expiry of said at least one other time period, transmission of the respective paging message for said mobile communication device in each cell of the at least one further set if the controller determines that a response has been received from the mobile communication device in response to a paging message for said mobile communication device transmitted in a cell of said first set.

7. The communication node of claim 2, wherein the controller is further configured to signal said mobile communication device in pursuance of a communications connection with said mobile communication device if the controller determines that a response has been received from the mobile communication device in response to a paging message for said mobile communication device.

8. The communication node of claim 2, further comprising means for updating at least one of said information and said further information in dependence on whether or not a response has been received from the mobile communication device in response to a paging message for said mobile communication device.

9. The communication node of claim 1, wherein the controller is further configured to identify that dummy paging is required for the mobile communication device and wherein the or at least one said paging message comprises a dummy paging message.

10. The communication node of claim 1, wherein the controller is further configured to identify that a communications connection is required for the mobile communication device and wherein the or at least one said paging message comprises a paging message in pursuance of the communications connection with said mobile communication device.

11. The communication node of claim 1, wherein said further information identifies a respective time at which said mobile communication device was located in said at least one cell.

12. The communication node of claim 1, wherein said further information comprises information identifying a time elapsed since a connection between said mobile communication device and said communication node was released.

13. The communication node of claim 1, wherein said further information comprises information identifying at least one further cell in which said mobile communication device has been located previously.

14. The communication node of claim 1, wherein said further information comprises information identifying a paging time at which said paging message or paging request is to be sent/received, wherein said communication node is operable to estimate an expected level of movement of said mobile communication device between said cells based on said paging time.

15. The communication node of claim 1 comprising a home base station gateway.

16. The communication node of claim 1 comprising a mobility management entity.

17. The communication node of claim 1, wherein said further information comprises information relating to movement of the mobile communication device between cells when the mobile communication device is in an idle mode.

18. The communication node of claim 1, wherein said further information comprises information relating to movement of the mobile communication device between cells when the mobile communication device is in a connected mode.

19. The communication node of claim 1, wherein said further information comprises information relating to at least one transition of the mobile communication device between operating modes (e.g. between an idle mode and a connected mode).

20. The communication node of claim 1, wherein said information identifying at least one cell and/or said further information comprises a cell ID.

21. A communication node for a communication network, the communication node comprising:
  a controller, comprising one or more processors, configured to:
    identify that paging is required for a mobile communication device;
    obtain information identifying at least one cell in which said mobile communication device has been located previously and obtain further information relating to at least one of movement of the mobile communication device between cells and a time when said mobile communication device was located in said at least one cell;
    define a number of sets, each set comprising at least one cell in which to seek said mobile communication device, based on said obtained information wherein said sets include a first set comprising a first cell which the mobile communication device was most recently connected to and neighbouring cells of the first cell, wherein the neighbouring cells are selected based on said further information relating to at least one of movement of the mobile communication device between cells and the time when said mobile communication device was located in said at least one cell; and
    initiate transmission of a respective paging message for said mobile communication device in each cell of the number of sets and specify a respective time period after which said transmission should occur;
    wherein said respective time period is specified in dependence on which set comprises the cell in which each paging message is to be transmitted.

22. A base station for transmitting paging messages in a cell of a communication network, the cell operated by the base station, the base station comprising:
  a transceiver; and
  a controller, comprising one or more processors, configured to control the transceiver to:
    provide, to a communication node, information relating to a mobile communication device if the mobile communication device is or has previously been located within the cell, wherein said information comprises information identifying said cell and further information relating to at least one of: movement of the mobile communication device into and/or out of the cell; and a time when said mobile communication device was located in the cell;
    receive, when the base station operates a cell which is part of a first set comprising a first cell which the mobile communication device was most recently connected to and neighbouring cells of the first cell and wherein the neighbouring cells are selected by the communication node based on said further information relating to at least one of movement of the mobile communication device between cells and the time when said mobile communication device was located in said at least one cell, a request from the communication node to transmit a paging message for the mobile communication device, wherein said paging request is transmitted by the communication node based on the information and further information provided by the base station; and
    transmit an associated paging message for said mobile communication device in the cell in response to the request received from the communication node.

23. The base station of claim 22, wherein said controller is further configured to control the transceiver to receive a response to the paging message from the mobile communication device; and said providing means is operable to provide an indication to said communication node that the response has been received from the mobile communication device.

24. The base station of claim 23, wherein said controller is further configured to control the transceiver to:
  signal said mobile communication device in pursuance of a communications connection with said mobile communication device if said transceiver receives a response to the paging message from the mobile communication device.

25. The base station of claim 23, wherein the response received from the mobile communication device is a connection request.

26. The base station of claim 23, wherein, if a response to the paging message has not been received from the mobile communication device by the base station, said controller is further configured to control the transceiver to:
  provide an indication to said communication node that a response to said paging message has not been received from the mobile communication device.

27. The base station according to claim 22, wherein the controller is further configured to control the transceiver to:
receive information identifying a time period after which said paging message should be transmitted to the mobile communication device; and
transmit the associated paging message after said time period.

28. The base station according to claim 22, wherein the controller is further configured to control the transceiver to:
receive an indication from the communication node to cancel transmission of paging messages; and
cancel transmission of a previously requested paging message responsive to said indication to cancel transmission of paging messages.

29. The base station according to claim 22, wherein said request to transmit a paging message is a request to transmit a dummy paging message, and wherein said associated paging message is a dummy paging message.

30. A mobile communication device for a communication system comprising a communication node, a plurality of base stations, each configured to operate a cell, and the mobile communication device, wherein:
said communication node comprises:
a controller, comprising one or more processors, configured to:
identify that paging is required for the mobile communication device;
obtain information identifying at least one cell in which said mobile communication device has been located previously and for obtaining further information relating to at least one of: movement of the mobile communication device between cells; and a time when said mobile communication device was located in said at least one cell;
define a set in which to seek said mobile communication device, based on said information and said further information, the set comprising a first cell which the mobile communication device was most recently connected to and neighbouring cells of the first cell, wherein the neighbouring cells are selected based on said further information relating to at least one of movement of the mobile communication device between cells and the time when said mobile communication device was located in said at least one cell; and
initiate transmission of a respective paging message for said mobile communication device in each cell of said set;
each base station of said plurality of base stations comprises:
a transceiver;
a controller, comprising one or more processors, configured to control the transceiver to:
provide, to the communication node, information relating to the mobile communication device if the mobile communication device is or has previously been located within a cell operated by the base station, wherein said information comprises information identifying said cell operated by the base station and further information relating to at least one of: movement of the mobile communication device into and/or out of the cell operated by the base station; and a time when said mobile communication device was located in said cell operated by the base station;
receive, when the base station operates the cell which is part of the first set comprising the first cell which the mobile communication device was most recently connected to and neighbouring cells of the first cell and wherein the neighbouring cells are selected by the communication node based on said further information relating to at least one of movement of the mobile communication device between cells and the time when said mobile communication device was located in said at least one cell, a request from the communication node to transmit a paging message for the mobile communication device, wherein said paging request is transmitted by the communication node based on the information and further information provided by the base station; and
transmit an associated paging message for said mobile communication device in said cell operated by the base station in response to the request received from the communication node; and
said mobile communication device is operable to receive a paging message sent by a base station of said plurality of base stations in response to a paging request from said communication node and to respond to said paging message with a connection request.

31. A communication system comprising a communication node, a plurality of base stations, each configured to operate a cell, and at least one mobile communication device, wherein:
said communication node comprises:
a controller, comprising one or more processors, configured to:
identify that paging is required for the mobile communication device;
obtain information identifying at least one cell in which said mobile communication device has been located previously and for obtaining further information relating to at least one of: movement of the mobile communication device between cells; and a time when said mobile communication device was located in said at least one cell;
define a set in which to seek said mobile communication device, based on said information and said further information, the set comprising a first cell which the mobile communication device was most recently connected to and neighbouring cells of the first cell, wherein the neighbouring cells are selected based on said further information relating to at least one of movement of the mobile communication device between cells and the time when said mobile communication device was located in said at least one cell; and
initiate transmission of a respective paging message for said mobile communication device in each cell of said set;
each base station of said plurality of base stations comprises:
a transceiver;
a controller, comprising one or more processors, configured to control the transceiver to:
provide, to the communication node, information relating to the mobile communication device if the mobile communication device is or has previously been located within a cell operated by the base station, wherein said information comprises information identifying said cell operated by the base station and further information relating to at least one of: movement of the mobile communication device into and/or out of the cell operated by the base station; and a time when said mobile communication device was located in said cell operated by the base station;

receive, when the base station operates the cell which is part of the first set comprising the first cell which the mobile communication device was most recently connected to and neighbouring cells of the first cell and wherein the neighbouring cells are selected by the communication node based on said further information relating to at least one of movement of the mobile communication device between cells and the time when said mobile communication device was located in said at least one cell, a request from the communication node to transmit a paging message for the mobile communication device, wherein said paging request is transmitted by the communication node based on the information and further information provided by the base station; and transmit an associated paging message for said mobile communication device in said cell operated by the base station in response to the request received from the communication node.

32. A method performed by a communication node for a communication network, the method comprising:

identifying that paging is required for a mobile communication device;

obtaining information identifying at least one cell in which said mobile communication device has been located previously and obtaining further information relating to at least one of movement of the mobile communication device between cells and a time when said mobile communication device was located in said at least one cell;

defining a set in which to seek said mobile communication device, based on said information and said further information, the set comprising a first cell which the mobile communication device was most recently connected to and neighbouring cells of the first cell, wherein the neighbouring cells are selected based on said further information relating to at least one of movement of the mobile communication device between cells and the time when said mobile communication device was located in said at least one cell; and initiating transmission of a respective paging message for said mobile communication device in each cell of said set.

33. A method performed by a communication node for a communication network, the method comprising:

identifying that paging is required for a mobile communication device;

obtaining information identifying at least one cell in which said mobile communication device has been located previously and obtaining further information relating to at least one of movement of the mobile communication device between cells and a time when said mobile communication device was located in said at least one cell;

defining a number of sets, each set comprising at least one cell in which to seek said mobile communication device, based on said obtained information, wherein said sets include a first set comprising a first cell which the mobile communication device was most recently connected to and neighbouring cells of the first cell, wherein the neighbouring cells are selected based on said further information relating to at least one of movement of the mobile communication device between cells and the time when said mobile communication device was located in said at least one cell; and initiating transmission of a respective paging message for said mobile communication device in each cell of the number of sets and for specifying a respective time period after which said transmission should occur;

wherein said respective time period is specified in dependence on which set comprises the cell in which each paging message is to be transmitted.

34. A method performed by a base station operable to transmit paging messages in a cell of a communication network, the cell operated by the base station, the method comprising:

providing, to a communication node, information relating to a mobile communication device if the mobile communication device is or has previously been located within the cell, wherein said information comprises information identifying said cell and further information relating to at least one of: movement of the mobile communication device into and/or out of the cell; and a time when said mobile communication device was located in the cell;

receiving, when the base station operates a cell which is part of a first set comprising a first cell which the mobile communication device was most recently connected to and neighbouring cells of the first cell and wherein the neighbouring cells are selected by the communication node based on said further information relating to at least one of movement of the mobile communication device between cells and the time when said mobile communication device was located in said at least one cell, a request from the communication node to transmit a paging message for the mobile communication device, wherein said paging request is transmitted by the communication node based on the information and further information provided by the base station; and transmitting an associated paging message for said mobile communication device in the cell in response to the request received from the communication node.

35. A method performed by a mobile communication device for a communication system comprising a communication node, a plurality of base stations, each configured to operate a cell, said method comprising:

receiving a paging message sent by a base station of said plurality of base stations in response to a paging request from said communication node; and responding to said paging message with a connection request;

wherein the communication node performs the steps of:

identifying that paging is required for the mobile communication device;

obtaining information identifying at least one cell in which said mobile communication device has been located previously and obtaining further information relating to at least one of: movement of the mobile communication device between cells; and a time when said mobile communication device was located in said at least one cell;

defining a set in which to seek said mobile communication device, based on said information and said further information, the set comprising a first cell which the mobile communication device was most recently connected to and neighbouring cells of the first cell, wherein the neighbouring cells are selected based on said further information relating to at least one of movement of the mobile communication device between cells and the time when said mobile communication device was located in said at least one cell; and initiating transmission of a respective paging message for said mobile communication device in each cell of said set; and wherein each base station of said plurality of base stations performs the steps of:

providing, to the communication node, information relating to the mobile communication device if the mobile communication device is or has previously been located within a cell operated by the base station, wherein said information comprises information identifying said cell operated by the base station and further information relating to at least one of: movement of the mobile communication device into and/or out of the cell operated by the base station; and a time when said mobile communication device was located in said cell operated by the base station;

receiving, when the base station operates a cell which is part of the first set comprising the first cell which the mobile communication device was most recently connected to and neighbouring cells of the first cell and wherein the neighbouring cells are selected by the communication node based on said further information relating to at least one of movement of the mobile communication device between cells and the time when said mobile communication device was located in said at least one cell, a request from the communication node to transmit a paging message for the mobile communication device, wherein said paging request is transmitted by the communication node based on the information and further information provided by the base station; and transmitting an associated paging message for said mobile communication device in said cell operated by the base station in response to the request received from the communication node.

36. A method performed in a communication system comprising a communication node, a plurality of base stations, each configured to operate a cell, and at least one mobile communication device, said method comprising:

at the communication node:

identifying that paging is required for the mobile communication device;

obtaining information identifying at least one cell in which said mobile communication device has been located previously and obtaining further information relating to at least one of: movement of the mobile communication device between cells; and a time when said mobile communication device was located in said at least one cell;

defining a set in which to seek said mobile communication device, based on said information and said further information, the set comprising a first cell which the mobile communication device was most recently connected to and neighbouring cells of the first cell, wherein the neighbouring cells are selected based on said further information relating to at least one of movement of the mobile communication device between cells and the time when said mobile communication device was located in said at least one cell; and initiating transmission of a respective paging message for said mobile communication device in each cell of said set;

at a base station:

providing, to the communication node, information relating to the mobile communication device if the mobile communication device is or has previously been located within a cell operated by the base station, wherein said information comprises information identifying said cell operated by the base station and further information relating to at least one of: movement of the mobile communication device into and/or out of the cell operated by the base station; and a time when said mobile communication device was located in said cell operated by the base station;

receiving, when the base station operates a cell which is part of the first set comprising the first cell which the mobile communication device was most recently connected to and neighbouring cells of the first cell and wherein the neighbouring cells are selected by the communication node based on said further information relating to at least one of movement of the mobile communication device between cells and the time when said mobile communication device was located in said at least one cell, a request from the communication node to transmit a paging message for the mobile communication device, wherein said paging request is transmitted by the communication node based on the information and further information provided by the base station; and transmitting an associated paging message for said mobile communication device in said cell operated by the base station in response to the request received from the communication node.

* * * * *